United States Patent [19]

Musil

[11] Patent Number: 4,708,558
[45] Date of Patent: Nov. 24, 1987

[54] WIRE FASTENER

[75] Inventor: Edward C. Musil, Lyons, Ill.

[73] Assignee: Flexible Steel Lacing Company, Downers Grove, Ill.

[21] Appl. No.: 831,609

[22] Filed: Feb. 21, 1986

[51] Int. Cl.[4] .................................. F16B 15/06
[52] U.S. Cl. ........................... 411/457; 24/33 C; 411/472; 411/494; 411/530
[58] Field of Search ............... 411/457, 530, 458, 471, 411/472, 493, 494, 496, 497; 24/31 R, 31 B, 33 B, 31 C, 33 C, 35, 36, 39; 474/253, 255

[56] References Cited

U.S. PATENT DOCUMENTS

| 246,504 | 8/1881 | Hicks et al. | |
|---|---|---|---|
| 294,777 | 3/1884 | Forbes | 411/471 |
| 380,104 | 3/1888 | Gingras | |
| 380,105 | 3/1888 | Gingras | |
| 727,248 | 5/1903 | Winters | 411/472 |
| 728,675 | 5/1903 | Copeland | 411/494 X |
| 737,206 | 8/1903 | Capewell | 411/494 X |
| 1,114,237 | 10/1914 | Diamond | |
| 1,134,146 | 4/1915 | Matthaei | |
| 1,454,450 | 5/1923 | Moore | |
| 1,544,561 | 7/1925 | Diamond | |
| 2,224,532 | 12/1940 | Ziller | |
| 2,245,947 | 5/1941 | Warby | |
| 2,528,685 | 11/1950 | Brown | 411/472 |
| 2,983,974 | 5/1961 | Tebb et al. | |
| 3,735,451 | 5/1973 | Haythornthwaite | |
| 4,023,671 | 5/1977 | Krämer | |

FOREIGN PATENT DOCUMENTS

| 446488 | 2/1948 | Canada | 411/458 |
|---|---|---|---|
| 130581 | 5/1902 | Fed. Rep. of Germany | 24/36 |
| 844,699 | 7/1952 | Fed. Rep. of Germany | 411/471 |
| 492794 | 4/1954 | Italy | 411/457 |
| 258148 | 5/1882 | United Kingdom | 24/31 B |
| 4598 | 10/1905 | United Kingdom | 24/31 B |
| 685195 | 12/1952 | United Kingdom | 24/33 |

Primary Examiner—Lloyd A. Gall
Attorney, Agent, or Firm—Fitch, Even, Tabin & Flannery

[57] ABSTRACT

A fastener having pointed ends for penetrating a belt. The preferred fastener is a wire hook fastener for joining the ends of belting and it is formed with pointed wedge-shaped ends defined by inclined top surfaces and flat bottom surfaces and inwardly inclined sidewalls extending between the top and bottom surfaces. The pointed wedge-shaped ends penetrate the belting and in a plane which coincides with the surface of the belting to limit deflection to form a uniform and strong joint between the wire hook fastener and the belting.

7 Claims, 4 Drawing Figures

WIRE FASTENER

BACKGROUND OF THE INVENTION

This invention relates to means for connecting the ends of belts or the like. More particularly, this invention relates to fasteners for the flexible joining of belts.

The present invention is described herein with respect to its preferred form which is a wire hook fastener which is generally aligned with a plurality of such fasteners in a strip which comprises a plurality of triangular-shaped hooks with inwardly turned arms which terminate with sharp points. The ends of belting commonly are joined in abutting relation with fasteners which are commonly called wire hook fasteners. These fasteners are generally in a strip which includes a plurality of triangular-shaped wire hooks held in a parallel, longitudinal, spaced and adjacent relation. The hooks are held together by means such as paper board strips or a wire welded to each hook. Each hook has two inwardly bent arms each of which terminate in sharp points. These sharp points enable the hooks and the fastener strip to penetrate and engage the belting upon the application of force which will push the sharp hooks into the belting, bend the hooks and clinch or hold the ends of the belting in abutting relation through loops created by the bent hooks. Generally after clinching, the fastener strip engages the belting with all the loops formed by the hooks of the fastener strip in alignment transverse the end of the belt, with the joint being completed with a hinge pin being slipped between the loops formed by the triangular-shaped hooks which are bent at their angular apex.

In joining belting, it is important that the inwardly bent sharp arms of the hooks enter and penetrate the belting properly and not be deflected in an undesirable direction either upon entry into the belting or upon engagement of the surface of a setting tool. Known fasteners often have hooks which present edges which not only are like a knife edge, but cut belting similar to a knife edge. If the edge of the hook is deflected from being generally normal to the surface of the belting as it begins its penetration, a poor clinch will result. A poor clinch also results if the edge is deflected to an unintended angle when it abuttingly engages the surface of a setting tool. Moreover, the edges of the hooks may cause cuts which will weaken the belting and cause the ultimate destruction of the joint. Heretofore, to avoid the above problems, it has been proposed to provide hooks with conical pointed ends. Conical points permit the hook to penetrate the belting in a plane which coincides with the surface of the belting which limits deflection of the hook as it penetrates the belting. Hooks with conical points, however, would not only be expensive, but would be difficult to make through grinding, or otherwise, on a mass production basis.

It is another object of this invention to provide a wire hook fastener for joining belting or the like wherein the wire hook fastener will engage and penetrate the belting on a plane which coincides with the plane formed by the surface of the belting without deflection or swerving sideways therefrom.

It is another object of this invention to provide a fastener which will not deflect or swerve in an unintended direction when it piercingly engages the surface of a setting tool.

It is still another object of this invention to provide a method for making wire hook fasteners which have points which will engage and penetrate belting without deflection or swerving therefrom.

These and other objects of the invention will become more apparent with reference to the following detailed description and drawings of which:

DETAILED DESCRIPTION OF THE DRAWINGS

DETAILED DESCRIPTION OF THE PREFERRED EMBODIMENT

Figure 1:
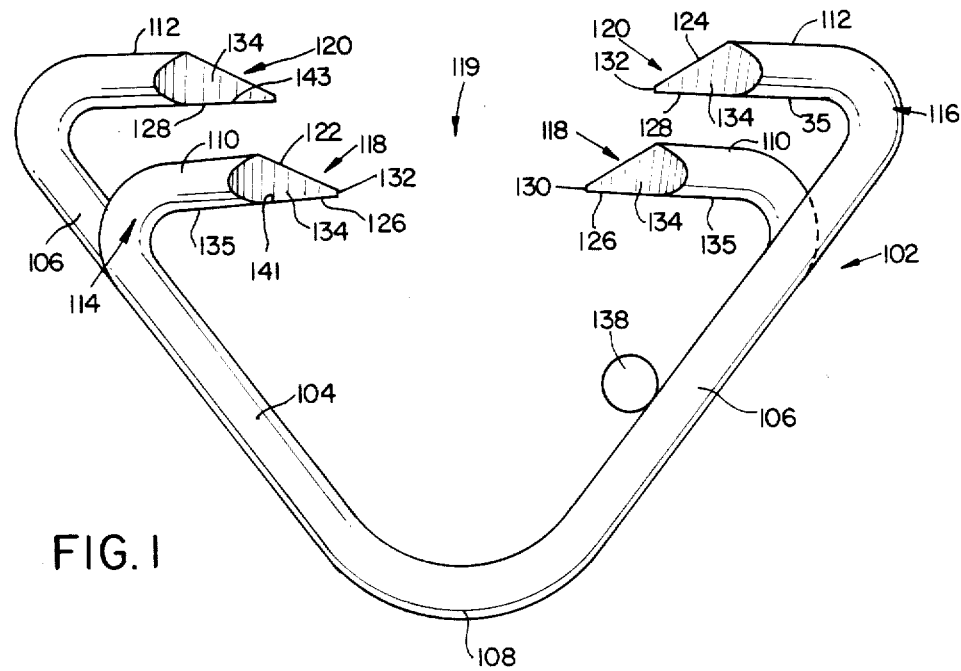
FIG. 1 is a side view of a wire hook fastener according to the invention.

Generally the invention provides a wire hook fastener for joining the ends of belting with a means for penetrating the belting which means has a point which allows the fastener to penetrate the belting in a plane which coincides with the surface of the belting to limit deflection from that plane and without deflection of the penetrating means from being generally normal to the surface of the belting as it begins its penetration to form a uniform and strong joint between the wire hook fastener and the belting.

As shown in the drawings for purposes of illustration, the invention is embodied in a wire hook fastener 102 of generally triangular-shape formed from a single piece of bent wire. The wire hook fastener has a central body formed by a pair of legs 104 extending angularly outwardly from a central arch or hinge portion 108. The legs extend from the central arch portion 108 to a hook end comprising curved bends 114 and 116 and straight arms 110 and 112 extending inwardly toward each other and terminating in points or penetrating means 118 and 120 for piercing a belt end (not shown) inserted through a space or throat 119 between the points 118 and 120. A clinching tool (not shown) will bend the points into opposite sides of the belt to bring the inner surfaces of the legs against the upper and lower surfaces of the belt with the end surface of the belt spaced from the arch 108 to receive the hinge pin (not shown).

Heretofore, the more common practice in manufacture of the points or piercing means 118 and 120 was to merely cut the wire with a slanted cut through the round wire which resulted in the pointed ends having surfaces defined by the cut which surfaces ended up slanting inwardly and outwardly in opposite directions when the wire was bent into the triangular-shape. To avoid such a condition, others have heretofore proposed making two cuts and to cut from the wire a central section which was discarded. Subsequently, when the wire was bent into the triangular-shape, the pointed ends became slanted in the same direction. The hook ends are formed slightly to one side and caused the point of the hook to penetrate the belt at an angle to a perpendicular plane to the belt surface particularly when the surfaces defining the points are cammed along the metal surface of the setting or clinching tool. That is, the clinching tool tends to swerve the points sideways because the cut surfaces defining the point are not aligned in a plane to roll the points straight through the belt. While it has been proposed to grind the points to a concentric conical point aligned with the longitudinal axis of the wire prior to bending the wire, such a process is prohibitively expensive.

Figure 3:
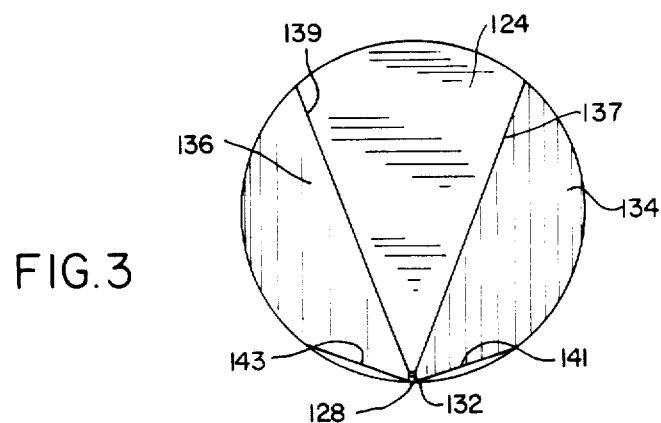
FIG. 3 is an enlarged view of the point of the wire hook fastener.
Figure 4:
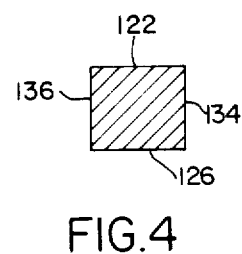
FIG. 4 is a cross-sectional view taken along the line 4—4 of FIG. 2.

In accordance with the present invention, wire hook fasteners 102 may be provided with identically shaped points 118 and 120 with outer inclined top surfaces 122 and 124 which abut the metal surface of the setting tool and roll the points in a uniform manner into the belt as wedge or chisel sidewalls 134 and 136 penetrate the belt and aid in preventing the point from buckling or swerving sideways. More specifically, the setting tool will engage the inwardly inclined top surfaces 122 and 124 and cam therealong as the tips 130, 132 enter the belt as the two triangular-shaped sidewalls 134 and 136 also cut and slide into the belt. As best seen in FIG. 3, each of the sidewalls 134 and 136 is tapered inwardly toward the center of the wire and at equal angles to assist in holding the arms at a straight angle perpendicular to the belt surface. Herein, each point is four sided and includes a bottom flat surface (126 or 128) which is generally in alignment with the underside 135 of the adjacent arm 110 or 112, as shown in FIG. 1. The triangular-shaped sidewalls are joined to the top wall along upper diagonally extending edges 137 and 139 which are sharpened edges which cut the belt. The triangular-shaped sidewalls join the bottom wall 128 along diagonally extending edges 141 and 143 which also cut into the belt. Thus, there are four flat surfaces converging to a point and four diagonal edges cutting into belt to hold and guide the points against swerving during the clinching operation. A vertical cross section taken anywhere through the point discloses a cross section which is rectangular, as shown in FIG. 4, with the upper edge being horizontal and parallel to the lower edge on the bottom wall 126 and with the vertical edges of the cross section being vertical and parallel to each other.

The means 118 for penetrating belting permits penetration of the surface of the belting with limited deflection. The penetrating means has a point 132 (FIG. 3) defined by an inclined top surface 124, a flat bottom surface 128 and sidewalls 134 and 136. The point 132 engages the belting in a plane which coincides with the plane of the belting. Deflection of the penetrating means is limited because the penetrating means has a sharp point with a very small surface which engages the surface of the belting uniformly in the plane of the surface of the belting. Deflection of the penetrating means from being normal to the belting also is limited. Moreover the inclined top surface permits the hook to be uniformly set by providing an angled surface to hit a metal anvil or setting tool to uniformly roll arms of the hook for a strong and uniform clinch. Heretofore the penetrating means of wire fasteners had edges which would angle away from the plane formed by the surface of the belting with only a small portion actually making initial contact with the belting when positioned for clinching and engagement therewith. This caused an undesirable deflection of the hook and sometimes cutting and tearing of the belting. Heretofore hooks with centered conical points would uniformly engage the belting, but did not provide an angled surface which would uniformly roll the arms of the hook upon engagement with a setting tool and such conical points were difficult and expensive to make through grinding on a mass production basis.

Referring in greater detail to FIG. 1 of the drawings, a triangular-shaped wire hook fastener 102 includes two legs 104 and 106 of unequal length which legs angularly emanate from one another in a V-shape at arch 108. Arms 110 and 112 are inwardly bent from legs 104 and 106, respectively, at bends 114 and 116 respectively, the legs and arms forming the triangular-shaped wire hook fastener with legs 104 and 106 and the arms opposite arch 108. In the preferred form the arms form acute angles with the legs and the legs form an acute angle with each other at arch 108.

The arms 110 and 112 terminate in a means 118 and 120, respectively, for penetrating the belting. The penetrating means point towards one another and are in spaced relation. The penetrating means are in offset relation because leg 104 is shorter than leg 106 which puts arms 110 and 112 in planes which are generally parallel, arm 110 being closer to arch 108 than arm 112.

Penetrating means 118 on arm 110 is generally opposite arch 108 and includes an inclined top surface 122, flat bottom surface 126, point 132 and sidewalls 134 and 136. Penetrating means 120 on arm 112 also has an inclined top surface 124, flat bottom surface 128, point 132 and sidewalls 134 and 136. The inclined top surfaces 122 and 124 are generally on the outer perimeter of the triangular-shaped hook fastener, opposite arch 108, legs 104 and 106, respectively, and face away from the arch and the legs from which the associated arms extend. They taper away from the legs and outer perimeter of the triangular-shaped hook towards the end of the arms and the lower surface of the arch. The flat bottom surfaces 126 and 128 are internal to the triangular-shaped wire hook fastener, face away from inclined surfaces 122 and 124, respectively, and face toward arch 108.

Figure 2:
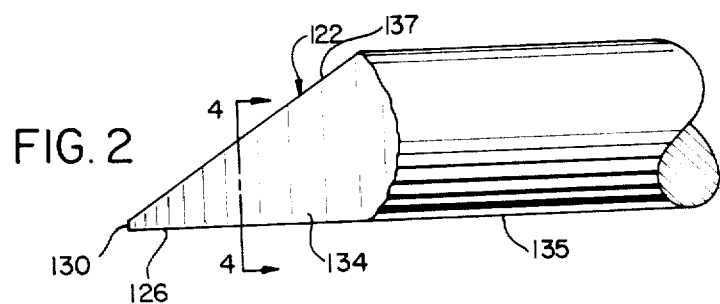
FIG. 2 is an expanded side view of the sharpened point of the wire hook fastener shown in FIG. 1.

Side walls, which preferably are planar, connect the flat bottom surface with the inclined top surface. As seen in FIG. 3 looking along line 4—4 of FIG. 2, planar sidewalls 134 and 136 extend downwardly from the top inclined surface 124 to the flat bottom surface 128. The sidewalls taper towards one another to the end of the arm forming a point 132 which lies in a plane which substantially coincides with the plane of the flat bottom surface. Similarly, penetrating means 118 has planar sidewalls which connect top inclined surface 122 with flat bottom surface 126 and which taper towards one another to form a point 130. Preferably the sidewalls of each penetrating means taper outwardly toward the flat bottom surface.

As seen in FIG. 1, a plurality of the triangular-shaped hooks 102 of the invention are held in a longitudinal array and in spaced relation to form a wire hook fastener strip. The hooks are held in spaced adjacent relation by a longitudinally extending rod 138 which is fixedly connected to the hooks by welding or the like as is known.

For application of the fastener hooks to a belt, the arms of the hooks 102 of one fastener strip are inserted into one end of the belt or belts and the hooks of a second fastener strip are inserted into the other opposing end of the belt or belts. The points of one hook of a fastener strip penetrate one belt. The hooks of the second fastener strip penetrate the opposing end of the belt to be joined. The hooks are bent and deformed at the apex of the V to have the arms penetrate the belting to hold the ends of the belt in abutting adjacent relation. To strengthen the clinch, an anvil may be provided to abut the arms of the fastener to roll the arms at an angle as they penetrate the belting. After the fastener strips have been associated with the belting with the legs of the hooks forming loops at the arch of the hooks, the loops formed by the hooks of one fastener strip are held in alternate adjacent relation with the loops formed by the hooks of the second fastener strip and a hinge pin is passed through the loops to complete the joint between the belts.

The invention provides a penetrating means for the hooks of wire hook fasteners for joining the ends of belting which hooks will penetrate belting with limited angular deflection from the plane of the belting. Moreover, the angle of the incline top surface of the penetrating means provides an advantage in uniformly setting the hook. The inclined surface provides an angled surface to hit a metal surface of a setting tool to uniformly roll the legs and arms of the hook in a uniform manner for a strong and uniform clinch of the fastener with the belting.

It should be understood that while certain preferred embodiments of the present invention have been illustrated and described, various modifications thereof will become apparent to those skilled in the art, and accordingly, the scope of the present invention should be defined only by the appended claims and equivalents thereof.

Various features of the invention are set forth in the following claims.

What is claimed is:

1. A fastener for penetrating a belt comprising:
a wire body having a central portion and a circular cross-section defining an outer cylindrical surface thereon,
a pair of legs extending angularly from opposite ends of the central portion and spaced apart at a predetermined distance, a pair of bent arms on the legs extending toward each other and defining a gap therebetween, sharpened pointed ends on the bent arms for penetrating the belt at spaced locations,
said pointed ends having four surfaces extending to and defining a tip including an upper inclined top surface which is substantially flat and which extends downwardly and inwardly, a flat bottom surface, and a pair of opposed flat sidewalls inclined inwardly at equal angles toward the tip,
said cylindrical surface having an outer surface portion facing outwardly and an inner surface portion facing inwardly,
each said flat bottom surface extending substantially coplanar with an inner surface portion on said bent arms, and
transition surfaces between said cylindrical surface portions of wire body and said inclined top surfaces and said inclined flat sidewalls of said pointed ends.

2. A fastener in accordance with claim 1 in which said point ends having a rectangular cross section.

3. A wire hook fastener comprising:
a wire body bent into a generally triangular-shape having a central arch portion,
said wire body having a circular cross section and outer cylindrical surface thereon,
a pair of legs extending angularly from the arch portion,
a pair of inwardly bent arms extending towards each other and defining a gap therebetween for receiving a belt end therebetween, sharpened pointed ends on the arms for penetrating the belt therebetween,
said pointed ends having four surfaces extending to and defining a tip including an upper inclined top surface extending downwardly and inwardly toward the gap, a bottom surface, and a pair of opposed flat sidewalls inclined inwardly at equal angles toward the tip,
said cylindrical surface having an outer surface area facing outwardly and an inner surface area facing inwardly,
each said flat bottom surface extending substantially coplanar with an inner surface area on said bent arms, and
transition surfaces between said cylindrical surface of wire body and said inclined top surfaces and said inclined flat sidewalls of said pointed ends.

4. A wire hook fastener for joining the ends of belting, the hook comprising:
a wire body of circular cross section and having a cylindrical surface thereon,
at least two legs angularly extending from one another on said wire body; and
at least one inwardly extending arm extending from each leg, each arm having an end which terminates with a sharp means for penetrating and engaging belting, the sharp penetrating means including
an inclined top surface on said sharp penetrating means,
a substantially flat bottom surface on said sharp penetrating means, and
two generally flat sidewall surfaces which connect the top surface and bottom surface and which taper towards one another to the end of the arm, the penetrating means allowing the hook to penetrate the belting in a plane which coincides with the surface of the belting and limit deflection from the belting to form a uniform and strong joint between the wire hook fastener and the belting,
said body wire having an outer surface area facing outwardly and an inner surface area facing inwardly,
each of said flat bottom surface areas extending substantially coplanar with an inner surface of said bent arms, and
transition surfaces between said cylindrical surface of wire body and said inclined top surfaces and said inclined flat sidwalls of said pointed ends.

5. A wire hook fastener as recited in claim 4, wherein a cross section taken through the penetrating means is rectangular in shape.

6. A wire hook fastener as recited in claim 5, wherein the hook has a generally triangular-shape having two legs, an arm extending from each leg and penetrating means on each arm generally pointing towards one another in spaced relation.

7. A wire hook fastener as recited in claim 6 wherein one leg is shorter than the other and the penetrating means are in offset relation.

* * * * *

UNITED STATES PATENT AND TRADEMARK OFFICE
CERTIFICATE OF CORRECTION

PATENT NO. : 4,708,558
DATED : November 24, 1987
INVENTOR(S) : EDWARD C. MUSIL

It is certified that error appears in the above-identified patent and that said Letters Patent is hereby corrected as shown below:

Column 1, Line 57, change "another" to --an--;

Column 6, Line 41, Change "body wire" to --wire body--.

Signed and Sealed this

Twenty-first Day of June, 1988

Attest:

DONALD J. QUIGG

Attesting Officer

Commissioner of Patents and Trademarks